United States Patent Office

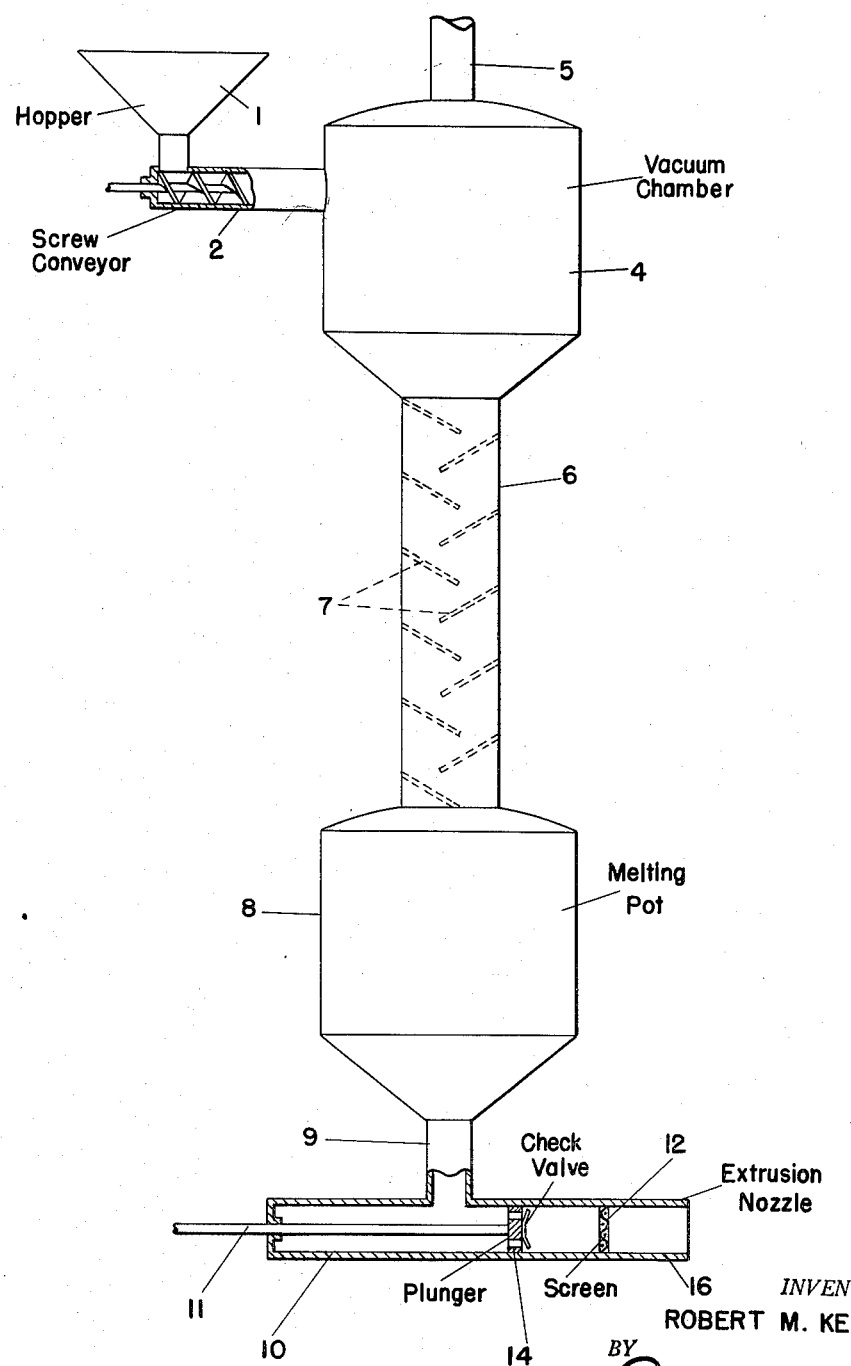

2,957,849
PROCESS FOR STABILIZING POLYPROPYLENE

Robert M. Kennedy, Newtown Square, Pa., assignor to Sun Oil Company, Philadelphia, Pa., a corporation of New Jersey Filed Mar. 27, 1957, Ser. No. 648,844

8 Claims. (Cl. 260—45.95)

This invention relates to a new process for the preparation of compositions of matter, and more particularly relates to a new process for the preparation of compositions consisting essentially of solid polymers of propylene and a stabilizer therefor.

The polymers of propylene which are used in the process of the present invention are relatively high molecular weight, solid polymers. Such polymers can be prepared by the polymerization of propylene using a solid catalytic material. A catalyst which is especially effective for the polymerization of propylene to relatively high molecular weight solid polymers is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane. On admixing the two components, a finely divided solid phase is formed as a dispersion in the inert solvent. This dispersion acts as a catalyst for polymerizing propylene to solid polymers. If desired, a lower halide such as titanium trichloride can be performed, dispersed in an inert liquid, and an activator such as an aluminum trialkyl added. This solid phase acts as a catalyst for polymerizing propylene to solid polymers. In performing the polymerization step, propylene is contacted with the solid catalyst, such as by passing the olefin through a suspension of the finely divided solid in the inert liquid reaction medium, and is thereby polymerized to solid polymers. Other materials can be substituted for the titanium trichloride and/or aluminum triethyl, as hereinafter described. Anhydrous and oxygen-free conditions are used throughout the process, since the catalyst is deactivated by contact with water or oxygen. After the polymerization is complete, a material such as an alcoholic solution of nitric acid is admixed with the polymer-catalyst to deactivate and remove, by dissolution, the solid catalyst particles. This catalyst removal, however, is incomplete and unsatisfactory, since the polymer tends to coat the catalyst particles thus preventing effective contact between the catalyst and deactivating solution.

The polypropyene product obtained as above described has a melting point of from 160° C. to 170° C., a tensile strength of from 4,000 to 6,000 p.s.i. (pounds per square inch), and a molecular weight of from 100,000 to 250,000. The polymer may be substantially crystalline or substantially amorphous in nature. Usually, a mixture of crystalline and amorphous polymer is obtained. If desired, amorphous polymer can be separated from the crystalline polymer by contacting a mixture thereof with a hydrocarbon solvent such as isooctane or n-heptane at an elevated temperature. The amorphous polymer is substantially soluble under these conditions whereas the crystalline polymer is substantially insoluble. Either crystalline or mixtures of crystalline with amorphous polymer in which the mixture contains at least 25% by weight, and preferably at least 50% by weight, of the crystalline polymer, are used in the present process. Especially good results, however, are obtained when the polymer consists essentially of crystalline polypropylene.

Polypropylene prepared as above described has many uses. However, the polymer is susceptible to oxidation, especially at elevated temperatures. Oxidation adversely affects the physical properties of the polymer and causes a marked reduction in molecular weight. For example, the softening point, tensile strength, flexural strength and the like are adversely affected by oxidation.

Methods heretofore described for incorporating stabilizers in polymers, including for example heating the polymer to above its melting point and admixing with the stabilizer, are unsatisfactory for use with polypropylene because of its relatively high melting point, and because prior methods do not remove substantially all of the oxygen from the polymer prior to heating, so that degradation of the polymer occurs. Also, the polymer usually contains an appreciable quantity of the solid catalyst, or solid inorganic material from the catalyst deactivation. This solid material may catalyze oxidation of the polymer, and exerts deleterious effects in subsequent uses of the polymer, such as by causing decolorization when the polymer is extruded and the like.

An object of the present invention is to provide a process for the preparation of compositions comprising solid propylene polymers containing a minor quantity of a material effective to prevent oxidation of the polymer. A further object is to provide a process for removing solid inorganic particles from polypropylene. Another object is to provide a process for removing catalyst and catalyst residues from polypropylene and for incorporating an oxidation inhibitor into the polymer to form a stable, homogeneous polypropylene product.

It has now been found that stabilizers can be incorporated into solid polymers of propylene by introducing a mixture of solid polypropylene and an inhibitor into an evacuation chamber wherein substantially all occluded air and/or oxygen is removed from the mixture. The mixture, still under vacuum, is then heated to above the melting point of the polypropylene. The stabilizer is incorporated into the molten polypropylene by being dissolved and/or dispersed therein. On cooling, either in vacuum or under an inert atmosphere, a stable composition is obtained. However, before cooling, it is advantageous to force the molten mixture of polypropylene and stabilizer through a relatively fine mesh screen which removes any solid particles such as catalyst particles and/or inorganic residues from catalyst deactivation. On cooling, the resulting composition is a highly stable, homogeneous composition substantially unaffected by oxygen at temperatures even above the melting point of the polypropylene.

Attention is now directed to the accompanying figure which illustrates an apparatus for performing the process of the invention. A mixture of polypropylene, preferably in granular or finely divided form, and a stabilizer such as a substituted phenol, is introduced to hopper 1. The solid particles of the mixtures are conducted via screw conveyor 2 into vacuum chamber 4. Conduit 5 connects vacuum chamber 4 to a suitable vacuum pump (not shown). From vacuum chamber 4, the particles cascade through baffle column 6 which provides sufficient time and exposure for substantially all of the occluded or adsorbed gases such as air and/or oxygen to be removed from the solid particles. Also, any liquid such as solvent, wash liquid, or other liquid which may have been introduced with the polypropylene is vaporized and removed through conduit 5. The admixture then enters melting pot 8 heated by any convenient means (not shown) to a temperature above the melting point of the polypropylene. In pot 8 the polypropylene is melted and the stabilizer is dissolved therein to form a homogeneous composition. If desired, mixing means (not shown) can be employed in the melting pot, but this is generally unnecessary. From melting pot 8 the molten mixture passes through conduit 9 into chamber 10 wherein it is forced by plunger 11 through screen 12. Check valves 14 operate so that polymer does not pass therethrough when the plunger is in motion toward screen 12, but does pass through the valves when the plunger is moving away from the screen. Screen 12 removes solid particles from the polypropylene-stabilizer mixture. The molten mixture passing through screen 12 is advantageously forced through extrusion nozzle 16 positioned adjacent screen 12 so that the polymer is formed into a desired shape without reheating and using additional pressure means. Particular extrusion nozzles are not illustrated since the particular type of nozzle employed does not form a part of this invention. In operating the process, equivalent mechanical means can be substituted for those shown, if desired. For example, a screw drive can be substituted for plunger 11.

In performing the process of the invention, an inhibiting quantity of a stabilizer is used. The class of inhibitors known as hindered phenols are preferably used in forming the compositions of the invention, and 2,2'-methylene-bis-(4-methyl-6-tert-butyl phenol) is a preferred inhibitor, or stabilizer, to employ since excellent results are obtained therewith as disclosed in copending application United States Serial Number 641,453, filed February 21, 1957 and now abandoned. By "hindered phenols" is meant substituted phenols having at least one hydroxyl group and at least one organic group attached to a benzene nucleus so that further substitution on the nucleus is, at least to some extent, hindered. Other inhibitors which have an inhibiting or stabilizing effect can be employed, such as di-(tert-butyl)-p-cresol; 4,4'-methylene-bis-(2,6-di-tert-butyl phenol); 2,5-ditertiarybutylhydroquinone; butyl hydroxy anisole; p-aminophenol; and homologues thereof and the like.

By "inhibiting quantity" of the stabilizer used is meant a quantity sufficient to substantially inhibit oxidation of polypropylene at elevated temperatures in contact with air. Such quantity will generally be within the range of from 0.03% to 1.5% by weight and such quantities give good results in accordance with the invention.

In order to obtain good results, the mixture of solid particles of polypropylene and inhibitor is subjected to a vacuum of from about 0.0001 to 0.1 mm. of mercury pressure for a time sufficient to remove any adsorbed oxygene, air, organic liquids, or the like. Such time will, of course, vary according to the operation used, and will generally be within the range of from about 1 to 30 seconds, but longer times and even much longer times can be used without deleterious results. As shown in the accompanying diagram, the use of a baffle column is advantageously used to expose the solid particles in the vacuum for the desired length of time.

The temperature maintained in the melting pot of the accompanying figure must be above the melting point of the polypropylene, but preferably is not more than 30° C. above the melting point. Accordingly, the temperature is advantageously maintained in the range of from 160° C. to 200° C. The screen employed to remove solid particles from the molten polymer is preferably a fine mesh screen so that even finely divided particles are removed from the polymer composition. For example, a screen of 425 mesh (U.S. Sieve Series) gives good results. Other filtering media such as sintered glass disks or the like can be used, but are more difficult to clean and hence not preferred.

In preparing polypropylene for use in the subject composition, a catalyst which is preferably a halide of titanium is used as above described, but other halides and salts of the metals of groups IV, V and VI of the periodic table can be employed. Preferably a halide or salt of titanium, zirconium, hafnium, vanadium, niobium, chromium, molybdenum or tungsten is used. The metal of the metal compound must be in a valence other than its highest valence state. The reduction of a metal compound such as titanium tetrachloride can be accomplished by any convenient means. As above described, an aluminum trialkyl can be used as the reducing agent, or other reducing means such as by contacting the metal compound with a dispersion of an alkali metal in an inert solvent can be used. It is necessary, however, that an activator such as an aluminum trialkyl be present as a component of the catalyst, and it is convenient in many instances to employ such a compound as both the reducing agent and the activator. However, the use of a prereduced compound, such as $TiCl_3$ or $TiCl_2$, together with an activator, gives excellent results. Materials which can be used as the activator, in addition to aluminum trialkyls, include other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like.

The quantities of catalytic components can be varied and good results obtained. A mole ratio of metal compound to activator of from 1:10 to 10:1 gives good results when the metal compound is prereduced or is reduced by the activator. The total quantities used are preferably such that a light slurry of the solid phase in the inert, liquid reaction medium which can be easily agitated is obtained. Generally from 1 part of catalyst particles to from 30 to 1,000 or more parts of the reaction medium gives good results.

As above described, the catalyst is a finely divided solid maintained as a slurry, or a dispersion, in an inert, liquid reaction medium. Saturated hydrocarbons such as the hexanes, heptanes, octanes, decanes, cyclopentanes, cyclohexanes, mixtures thereof and the like which are liquid under the conditions of reaction are preferred materials to use as the reaction medium. Propylene is introduced into the catalyst slurry such as by bubbling propylene in gas phase into the slurry. If desired, the propylene can be dissolved in a hydrocarbon which is preferably the same as the reaction medium, and the resulting solution contacted with the catalyst slurry. The polymerization is performed under polymerizing conditions including a temperature within the range of from about 0° C. to 250° C. and a pressure of from atmospheric to about 5,000 p.s.i.g. (pounds per square inch gauge) or more, it being necessary that the reaction medium be maintained in the liquid phase.

After the polymerization, the polymer is separated from the reaction mixture such as by admixing the reaction mixture with water, alcohol, or an aqueous or alcoholic solution of an inorganic acid such as nitric acid. The mixing is preferably accomplished by means which also comminute the catalyst. This treatment dissolves a portion of the catalytic materials from the polymer, but a significant portion remains in the polymer and is removed therefrom in accordance with the present invention. Also, it is unnecessary to use such treatment, i.e., treatment designed to remove catalyst, since the catalyst particles are substantially completely removed in the present process.

The following specific embodiment illustrates the process of the invention in which "parts" refers to parts by weight.

Crystalline polypropylene was prepared, as above described, by introducing 9.9 parts of titanium trichloride and 7.76 parts of aluminum triisobutyl into a reactor together with about 2022 parts of n-heptane. The temperature of the mixture was adjusted to 90° C. and propylene was then introduced into the reactor to a pressure of 100 p.s.i.g. Constant mechanical agitation was maintained for 11.38 hours, during which time the temperature was maintained at about 89° C. to 90° C. and the pressure at substantially 100 p.s.i.g. by periodic addition of propylene to the reactor. The reaction was stopped and the catalyst deactivated and removed by contacting the polypropylene product with a solution of nitric acid in isopropyl alcohol with vigorous agitation. The polymer product was separated and contacted with n-pentane. 246.6 parts of the polymer were soluble in the pentane and were recovered therefrom as an amorphous product. 1352.5 parts of the polymer were insoluble in the pentane and were recovered as crystalline polypropylene. This crystalline polypropylene had a molecular weight of 150,000 and a melting point of 166° C.

To a portion of the crystalline polypropylene so-prepared is admixed 0.1% by weight of 2,2'-methylene-bis-(4-methyl-6-tert-butyl phenol). The resulting mixture is then introduced into a vacuum chamber which is maintained at about 0.05 mm. of mercury pressure for about 30 seconds. While maintaining the vacuum, the mixture is then heated to 185° C. for about 8 minutes. The molten mixture is then forced through a fine mesh screen. The product obtained is a homogeneous, highly stable composition. Comparing the stability of this composition with the composition without the additive shows a greatly enhanced stability, the susceptibility of the polymer to oxidation being substantially completely inhibited.

The high stability of the composition of the invention is shown by heating in contact with air at an elevated temperature of about 155° C. for several hours, and then determining the amount of oxidation. The melt index, an increase in which shows a decrease in molecular weight and a deterioration in physical properties, is a convenient measure of oxidation. By "melt index" is meant the weight of polymer, expressed in grams, extruded through an orifice 0.0823 inch in diameter from a barrel 0.3760 inch in diameter under the force of a piston weighing 2160 grams, the polymer being maintained at 190° C. during the extrusion. For example, heating the composition as above prepared in air for 2 hours at 155° C. fails to give a measurable change in melt index. A comparable composition without an inhibitor shows an increase in melt index by more than 15 times its initial value. Inhibited compositions prepared by methods heretofore known exhibit intermediate melt indices when heated for comparable times at the same temperature. Also, infrared spectroscopy indicates no appreciable increase in oxygen content of the polymer product of the invention when heated in air as above described.

The polymer products of the invention are especially useful in industrial applications where the polymer is subjected to elevated temperatures in contact with oxygen. Such uses include, for example, conduits for transporting fluids, containers for corrosive fluids, films for packaging food products, and the like. Such articles can be prepared by molding, extrusion, or other fabrication means.

The invention claimed is:

1. Process for the preparation of stabilized polypropylene which comprises admixing solid polypropylene with a stabilizer therefor, subjecting the resulting mixture to a vacuum effective to remove substantially all oxygen, maintaining the mixture in said vacuum while heating the mixture to a temperature not substantially higher than about 30° C. above the melting point of the polypropylene, and cooling and recovering stabilized polypropylene.

2. Process for the preparation of stabilized polypropylene which comprises admixing solid polypropylene with from 0.03% to 1.5% by weight of a stabilizer, subjecting the resulting mixture to a vacuum of from about 0.0001 to 0.1 mm. of mercury pressure for a time sufficient to remove oxygen therefrom, maintaining the mixture in said vacuum while heating the mixture to a temperature above the melting point of said polypropylene in the range of about 160 to 200° C., whereby the stabilizer becomes dispersed in the molten polypropylene, and cooling the mixture to solidify the polypropylene.

3. Process according to claim 2 wherein said stabilizer is 2,2'-methylene-bis-(4-methyl-6-tertiary butyl phenol).

4. Process according to claim 2 wherein said stabilizer is di-(tertiary butyl)-para-cresol.

5. Process according to claim 2 wherein said stabilizer is 4,4'-methylene-bis-(2,6-ditertiary butyl phenol).

6. Process according to claim 2 wherein said stabilizer is butyl hydroxy anisole.

7. Process for the preparation of stabilized polypropylene which comprises admixing solid polypropylene with from 0.03% to 1.5% by weight of a stabilizer, subjecting the resulting mixture to a vacuum of from about 0.0001 to 0.1 mm. of mercury pressure for a time sufficient to remove oxygen therefrom, maintaining the mixture in said vacuum while heating the mixture to a temperature not substantially higher than about 30° C. above the melting point of said polypropylene, dispersing said stabilizer in the molten polypropylene, forcing the molten mixture through a screen thereby to remove solid particles therefrom, and cooling the mixture to solidify the polypropylene.

8. Process according to claim 7 wherein said heating above the melting point of said polypropylene takes place in the range of between about 160 and 200° C.

References Cited in the file of this patent

UNITED STATES PATENTS

| | | |
|---|---|---|
| 2,255,729 | Britton | Sept. 9, 1941 |
| 2,776,274 | Cairns | Jan. 1, 1957 |
| 2,806,009 | Lewis | Sept. 10, 1957 |
| 2,824,090 | Edwards et al. | Feb. 18, 1958 |
| 2,835,659 | Guillet | May 20, 1958 |
| 2,880,201 | Peters et al. | Mar. 31, 1959 |

OTHER REFERENCES

Raff et al.: "Polyethylene," 71, 103–108, Interscience (1956).